United States Patent Office 3,528,946
Patented Sept. 15, 1970

3,528,946
ACETYLACETONATES AS POLYCONDENSATION CATALYSTS IN TRANSESTERIFICATION METHOD OF PREPARING POLYESTERS
Mary J. Stewart, Riddlewood, Media, and John A. Price, Swarthmore, Pa., assignors to FMC Corporation, Philadelphia, Pa., a corporation of Delaware
No Drawing. Filed Aug. 30, 1967, Ser. No. 664,265
Int. Cl. C08g 17/015
U.S. Cl. 260—75                             7 Claims

ABSTRACT OF THE DISCLOSURE

A process of preparing polyethylene terephthalate resin comprising carrying out a transesterification reaction between ethylene glycol and dimethyl terephthalate in the presence of a conventional transesterification catalyst to form a polyester prepolymer and then polycondensing the resulting prepolymer in the presence of a catalytic amount of an acetylacetonate selected from the group consisting of aluminum acetylacetonate, lead acetylacetonate, cerium acetylacetonate, thorium acetylacetonate, chromium acetylacetonate, copper acetylacetonate, and vanadium acetylacetonate.

---

This invention relates to an improved method for the preparation of linear polyesters. More particularly, it relates to an improved polycondensation catalyst for use in the transesterification method of preparing highly polymeric polyesters which are suitable for fiber- and film-forming purposes.

It is known that linear polyesters can be prepared from esters of a dicarboxylic acid and a diol through the use of a two-stage process. In the first stage of this process, an ester of a dicarboxylic acid, such as dimethyl terephthalate, and a diol, such as ethylene glycol, are subjected to a transesterification or ester-interchange reaction in the presence of a transesterification catalyst to form the corresponding diglycol terephthalate. In the second stage, the resulting diglycol terephthalate is polycondensed to form a polyester resin. When dimethyl terephthalate is the dicarboxylic acid ester used, and the glycol used is ethylene glycol, the product or prepolymer of the transeterification reaction is comprised mainly of bis-2-hydroxyethyl terephthalate.

It is generally considered that a polyethylene terephthalate resin suitable for spinning into filaments should have a carboxyl content value of about or below 50 equivalents per million grams (eq./$10^6$ gr. or meq./kg.), a melting point preferably of about at least 258–260° C., and an intrinsic viscosity preferably of about at least 0.60 or more (determined in a 60% phenol and 40% tetrachloroethane solution, wt./wt., at 30° C.), in order for the filaments formed therefrom to possess a satisfactory level of hydrolytic stability, thermal stability, and a high degree of tenacity, which is generally considered necessary for the use of such filaments in the manufacture of fabrics and the like. It is preferable that polyester resins for film-forming purposes possess similar properties.

It is an object of the present invention to prepare highly polymeric linear polyesters by an ester-interchange reaction between a diol and an ester of a dicarboxylic acid in the presence of a transesterification catalyst, and then polycondense the resulting prepolymer in the presence of an improved polycondensation catalyst.

Another object of the present invention is to prepare polyethylene terephthalate suitable for commercial filament- and film-forming purposes by carrying out a transesterification reaction between dimethyl terephthalate and ethylene glycol in the presence of a transesterification catalyst to form a prepolymer and then polycondensing the said prepolymer in the presence of an improved polycondensation catalyst.

It is another object of the present invention to prepare a highly polymeric polyethylene terephthalate by polycondensing bis-2-hydroxyethyl terephthalate in the presence of an improved polycondensation catalyst.

These and other objects are accomplished in accordance with the present invention, which involves a method of preparing highly polymeric linear polyesters wherein dimethyl terephthalate is reacted with ethylene glycol in the presence of a transesterification or ester-interchange catalyst to form a polyester prepolymer and where the resulting polyester prepolymer is polycondensed, the improvement comprising carrying out the polycondensation of the said polyester prepolymer in the presence of a catalytic amount of an acetylacetonate selected from the group consisting of aluminum acetylacetonate, lead acetylacetonate, cerium acetylacetonate, thorium acetylacetonate, chromium acetylacetonate, copper acetylacetonate, and vanadium acetylacetonate.

In general, the preparation of polyethylene terephthalate resin via the ester-interchange or transesterification reaction is carried out with a molar ratio of ethylene glycol to dimethyl terephthalate of from about 1:1 to about 15:1, respectively, but preferably from about 1.2:1 to about 2.6:1. The ester-interchange reaction is generally carried out at atmospheric pressure in an inert atmosphere such as nitrogen, initially at a temperature range of from about 125° C. to about 250° C., but preferably between about 150° C. and 200° C. in the presence of a transesterification catalyst. During the first stage of this reaction, methyl alcohol is evolved and is continuously removed by distillation. After a reaction period of 1 to 3 hours, the temperature of the reaction mixture is raised to from about 220° C. to about 300° C. for approximately 1 to 3 hours in order to complete the reaction, so as to form the desired polyester prepolymer and distill off any excess glycol. The prepolymer product of the transesterification reaction between ethylene glycol and dimethyl terephthalate is comprised mainly of bis-2-hydroxyethyl terephthalate. The second stage or polycondensation step of the present method is achived under reduced pressure within the range of from about 0.05 mm. to 20 mm. of mercury at temperatures from about 260° C. to about 325° C. for about 2 to 5 hours in the presence of a polycondensation catalyst of the present invention.

Any suitable transesterification or ester-interchange catalyst, for example, lithium hydride or zinc acetate, can be used to catalyze the present transesterification reaction. Generally, a transesterification catalyst is used in concentrations of from about 0.01% to about 0.20%, based on the weight of the dialkyl terephthalate in the initial reaction mixture.

The polycondensation catalysts of the present invention are generally employed in amounts ranging from 0.01% to about 0.2%, based on the weight of the polyester prepolymer to be polycondensed. Usually, it has been found that from about 0.02% to about 0.1% of an acetylacetonate compound of the present invention is preferred in most instances. Higher or lower concentrations of the present catalysts can be used. However, when concentrations less than the above are used, their effectiveness is generally reduced, whereas if concentrations greater than this are used, no further improvement in the present method or desired product are generally obtained.

The following examples represent several preferred embodiments of, and will serve to further illustrate the present invention. All parts are by weight unless otherwise indicated.

EXAMPLE I

A mixture comprising 600 g. of dimethyl terephthalate, 396 mls. of ethylene glycol, and 0.24 g. of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then, the temperature of the reaction mixture was allowed to raise to 230° C. over a period of about one hour to distill off any remaining by-product methyl alcohol and ethylene glycol and form the polyester prepolymer comprised mainly of bis-2-hydroxyethyl terephthalate. The prepolymer product was allowed to cool under an atmosphere of nitrogen.

EXAMPLE II

Fifty grams of the prepolymer product of Example I was mixed with 0.20 g. of aluminum acetylacetonate and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I, and formation of a polyethylene terephthalate resin. The resulting polyester resin had an intrinsic viscosity of 0.78, a carboxyl content value of 14 (meq./kg.) and a melting point of 267° C.

EXAMPLE III

Fifty grams of the prepolymer product of Example I was mixed with 0.02 g. of lead acetylacetonate and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I, and formation of a polyethylene terephthalate resin. The resulting polyester resin product had an intrinsic viscosity of 0.75, a carboxyl content value of 14 (meq./kg.) and a melting point of 267° C.

EXAMPLE IV

Fifty grams of the prepolymer product of Example I was mixed with 0.02 g. of cerium acetylacetonate and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I, and formation of a polyethylene terephthalate resin. The resulting polyester resin product had an intrinsic viscosity of 0.68, a carboxyl content value of 14 (meq./kg.) and a melting point of 265° C.

EXAMPLE V

Fifty grams of the prepolymer product of Example I was mixed with 0.02 g. of thorium acetylacetonate and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I, and formation of a polyethylene terephthalate resin. The resulting polyester resin product had an intrinsic viscosity of 0.69, a carboxyl content value of 9 (meq./kg.) and a melting point of 267° C.

EXAMPLE VI

Fifty grams of the prepolymer product of Example I was mixed with 0.02 g. of chromium acetylacetonate and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I and formation of a polyethylene terephthalate resin. The resulting polyester resin product had an intrinsic viscosity of 0.60, a carboxyl content value of 11 (meq./kg.) and a melting point of 267° C.

EXAMPLE VII

Fifty grams of the prepolymer product of Example I was mixed with 0.02 g. of copper acetylacetonate and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I and formation of a polyethylene terephthalate resin. The resulting polyester resin product had an intrinsic viscosity of 0.59, a carboxyl content value of 7 (meq./kg.) and a melting point of 268° C.

EXAMPLE VIII

Fifty grams of the prepolymer product of Example I was mixed with 0.02 g. of vanadium acetylacetonate and placed in a reaction vessel. The reaction mixture was heated at about 280° C. under reduced pressure of from about 0.05 to about 0.1 mm. of mercury while under agitation for about three hours to bring about the polycondensation of the prepolymer product of Example I and formation of a polyethylene terephthalate resin. The resulting polyester resin product had an intrinsic viscosity of 0.67, a carboxyl content value of 38 (meq./kg.) and a melting point of 264° C.

The intrinsic viscosity of the polyester resin products of the examples above were measured in a 60% phenol and 40% tetrachloroethane solution, wt./wt., at 30° C. The other analytical values were obtained through the use of conventional laboratory quantitative procedures.

The process of the present invention has been described with particular reference to polyethylene terephthalate, but it will be obvious that the subject invention includes within its scope other polymethylene terephthalates formed from glycols of the series $HO(CH_2)_nOH$, where $n$ is 2 to 10 and terephthalic acid esters and copolyesters containing varied amounts of other suitable esters of dicarboxylic acid, such as isophthalic acid.

The results in the above examples indicate that the subject acetylacetonate compounds, when used in accordance with the present method, facilitate the preparation of and enhance the polyester resins produced. Through the use of the present method, polyester resins can be produced which are characterized by low carboxyl content values, high melting points, and high molecular weights, as indicated by their intrinsic viscosities, so as to make such resins particularly valuable for use in the manufacture of films, filaments, and fibers that would have excellent properties for commercial use.

It will be apparent that various different embodiments may be made practicing the invention without departing from the spirit and scope thereof, and therefore, it is not to be limited except as indicated in the appended claims.

We claim:

1. In a process of preparing polyethylene terephthalate resin wherein dimethyl terephthalate is reacted with ethylene glycol in the presence of a transesterification catalyst to form a polyester prepolymer and where the resulting polyester prepolymer is polycondensed, the improvement comprising carrying out the polycondensation of the said polyester prepolymer in the presence of a catalytic amount of an acetylacetonate polycondensation catalyst selected from the group consisting of aluminum acetylacetonate, lead acetylacetonate, cerium acetylacetonate, thorium acetylacetonate, and copper acetylacetonate.

2. The process of claim 1 wherein the acetylacetonate is present in an amount ranging from about 0.01% to about 0.2%, based on the weight of the polyester prepolymer.

3. The process of claim 1 wherein the acetylacetonate is aluminum acetylacetonate.

4. The process of claim 1 wherein the acetylacetonate is lead acetylacetonate.

5. The process of claim 1 wherein the acetylacetonate is cerium acetylacetonate.

6. The process of claim 1 wherein the acetylacetonate is thorium acetylacetonate.

7. The process of claim 1 wherein the acetylacetonate is copper acetylacetonate.

References Cited

UNITED STATES PATENTS

| | | | |
|---|---|---|---|
| 2,857,363 | 10/1958 | Easley et al. | 260—75 |
| 3,245,959 | 4/1966 | Roeser | 260—75 |

FOREIGN PATENTS

| | | |
|---|---|---|
| 960,786 | 6/1964 | Great Britain. |
| 1,297,516 | 5/1962 | France. |

WILLIAM H. SHORT, Primary Examiner

L. P. QUAST, Assistant Examiner

U.S. Cl. X.R.

260—475